(12) United States Patent
Gravina

(10) Patent No.: US 11,493,407 B2
(45) Date of Patent: Nov. 8, 2022

(54) TORQUE MEASUREMENT SYSTEM

(71) Applicant: GE Avio S.r.l., Rivalta di Torino (IT)

(72) Inventor: Michele Gravina, Minervino Murge (IT)

(73) Assignee: GE AVIO S.R.L., Rivalta di Torino (IT)

(*) Notice: Subject to any disclaimer, the term of this patent is extended or adjusted under 35 U.S.C. 154(b) by 310 days.

(21) Appl. No.: 16/584,125

(22) Filed: Sep. 26, 2019

(65) Prior Publication Data
US 2020/0103315 A1 Apr. 2, 2020

(30) Foreign Application Priority Data

Sep. 28, 2018 (IT) .................... 102018000009034

(51) Int. Cl.
| | | |
|---|---|---|
| *G01L 3/00* | (2006.01) | |
| *G01M 15/14* | (2006.01) | |
| *F01D 17/02* | (2006.01) | |
| *G01L 5/12* | (2006.01) | |

(52) U.S. Cl.
CPC ............ *G01M 15/14* (2013.01); *F01D 17/02* (2013.01); *G01L 3/00* (2013.01); *G01L 5/12* (2013.01)

(58) Field of Classification Search
CPC ........ G01M 15/14; F01D 17/02; F01D 25/16; G01L 3/00; G01L 5/12; G01L 3/10; G01L 5/0009; G01L 5/0042; B64D 33/00; B64D 43/00; Y02T 50/60; B64C 27/12; F02C 7/06
See application file for complete search history.

(56) References Cited

U.S. PATENT DOCUMENTS

| | | | |
|---|---|---|---|
| 3,038,765 | A | 6/1962 | Tupper |
| 3,738,719 | A | 6/1973 | Langner |
| 3,922,852 | A | 12/1975 | Drabek |
| 4,539,835 | A | 9/1985 | Shambroom |
| 4,727,321 | A | 2/1988 | Huschelrath |

(Continued)

FOREIGN PATENT DOCUMENTS

| | | |
|---|---|---|
| CN | 2694245 Y | 4/2005 |
| CN | 101395460 | 3/2009 |

(Continued)

OTHER PUBLICATIONS

Italian Office Action Corresponding to 102018000009034 dated Jun. 24, 2019.

(Continued)

*Primary Examiner* — Freddie Kirkland, III
(74) *Attorney, Agent, or Firm* — Fitch, Even, Tabin & Flannery LLP

(57) ABSTRACT

A system for torque measurement is generally provided. The system includes a sensor disposed between an outer bearing race and a static structure of a bearing assembly. The sensor is disposed adjacent along a thrust load direction to the outer bearing race. The system further includes a rotor assembly rotatably coupled to the bearing assembly, and a controller communicatively coupled to the sensor. The controller is configured to store and execute operations. The operations include determining a torque measurement from the rotor assembly based at least on an axial thrust load from the rotor assembly.

17 Claims, 7 Drawing Sheets

(56) References Cited

U.S. PATENT DOCUMENTS

| | | | |
|---|---|---|---|
| 4,850,719 A | 7/1989 | Moseley | |
| 5,051,005 A | 9/1991 | Duncan | |
| 5,052,828 A | 10/1991 | Ciokajlo | |
| 5,277,281 A | 1/1994 | Carlson | |
| 5,317,908 A | 6/1994 | Fitzgerald | |
| 5,386,733 A | 2/1995 | Hesthamar | |
| 5,658,125 A | 8/1997 | Burns | |
| 5,708,216 A | 1/1998 | Garshelis | |
| 5,836,739 A | 11/1998 | Haramura | |
| 5,915,513 A | 6/1999 | Isley, Jr. | |
| 5,931,052 A | 8/1999 | Zhao | |
| 5,984,056 A | 11/1999 | Agnihotri | |
| 6,116,784 A | 9/2000 | Brotz | |
| 6,183,386 B1 | 2/2001 | Duggan | |
| 6,237,428 B1 | 5/2001 | Odachi | |
| 6,260,351 B1 | 7/2001 | Delano | |
| 6,287,074 B1 | 9/2001 | Chancellor | |
| 6,330,833 B1 | 12/2001 | Opie | |
| 7,018,102 B1 | 3/2006 | Brotz | |
| 7,115,336 B2 | 10/2006 | Revol | |
| 7,138,093 B2 | 11/2006 | McKay | |
| 7,431,504 B1 | 10/2008 | Pelfrey | |
| 7,806,011 B2 | 10/2010 | Eichenberger | |
| 8,020,455 B2 | 9/2011 | Sihler | |
| 8,170,811 B2 | 5/2012 | Grab | |
| 8,205,445 B2 | 6/2012 | Browne | |
| 8,215,898 B2 | 7/2012 | Nakazeki et al. | |
| 8,359,744 B2 | 1/2013 | Hislop | |
| 8,413,773 B2 | 4/2013 | Anderfaas | |
| 8,527,247 B1 | 9/2013 | Wilson | |
| 8,662,756 B2 | 3/2014 | Care | |
| 8,702,377 B2 | 4/2014 | Cottrell | |
| 8,727,632 B2 | 5/2014 | Do | |
| 8,814,503 B2 | 8/2014 | McCune | |
| 8,936,660 B2 | 1/2015 | Cruz Aguado | |
| 8,974,344 B2 | 3/2015 | McCune | |
| 9,046,130 B2 | 6/2015 | Kachinski | |
| 9,091,309 B2 | 7/2015 | Battlogg | |
| 9,103,321 B1 | 8/2015 | Bardia | |
| 9,121,305 B2 | 9/2015 | Nicholson | |
| 9,121,448 B2 | 9/2015 | Delgado Marquez | |
| 9,134,072 B2 | 9/2015 | Roisin | |
| 9,146,163 B2 | 9/2015 | Sipila | |
| 9,212,958 B2 | 12/2015 | Campbell | |
| 9,222,525 B2 | 12/2015 | Yamamoto et al. | |
| 9,234,811 B2 | 1/2016 | Brummel | |
| 9,239,012 B2 | 1/2016 | McCune | |
| 9,297,310 B2 | 3/2016 | Giri | |
| 9,447,817 B2 | 9/2016 | Gallimore | |
| 9,476,320 B2 | 10/2016 | Savela | |
| 9,476,691 B2 | 10/2016 | May | |
| 9,500,230 B2 | 11/2016 | Hiller | |
| 9,506,824 B2 | 11/2016 | Motoe | |
| 9,512,874 B2 | 12/2016 | Hennig | |
| 9,523,422 B2 | 12/2016 | McCune | |
| 9,528,776 B1 | 12/2016 | Roper | |
| 9,528,889 B2 | 12/2016 | Masuda | |
| 9,546,570 B2 | 1/2017 | Fletcher | |
| 9,562,616 B2 | 2/2017 | Strom | |
| 9,638,062 B2 | 5/2017 | Davis | |
| 9,644,541 B2 | 5/2017 | Morreale | |
| 9,714,584 B2 | 7/2017 | Morris | |
| 9,856,751 B2 | 1/2018 | Duong | |
| 10,359,324 B2 | 7/2019 | Sipilä | |
| 10,495,060 B2 * | 12/2019 | Caruso | F03D 7/0244 |
| 10,823,003 B2 * | 11/2020 | Aguilar | F16C 41/00 |
| 10,871,409 B2 | 12/2020 | Sipila | |
| 10,975,717 B2 | 4/2021 | Moniz et al. | |
| 11,002,335 B2 | 5/2021 | Ghosh | |
| 2007/0089538 A1 | 4/2007 | Kashimura | |
| 2008/0282820 A1 | 11/2008 | Eichenberger | |
| 2010/0015918 A1 | 1/2010 | Liu | |
| 2012/0111024 A1 | 5/2012 | Kachinski | |
| 2012/0292143 A1 | 11/2012 | Anderfaas | |
| 2014/0109580 A1 | 4/2014 | Giri | |
| 2014/0284163 A1 * | 9/2014 | Yamamoto | F16D 28/00 192/66.3 |
| 2015/0008912 A1 | 1/2015 | Maier | |
| 2015/0217866 A1 | 8/2015 | Spina | |
| 2016/0178464 A1 | 6/2016 | Burns | |
| 2016/0195438 A1 | 7/2016 | Brummel | |
| 2016/0215760 A1 | 7/2016 | Powell | |
| 2016/0230591 A1 | 8/2016 | Brummel | |
| 2016/0312645 A1 | 10/2016 | Ribarov | |
| 2016/0341070 A1 | 11/2016 | Garcia | |
| 2016/0376984 A1 | 12/2016 | Sheridan | |
| 2017/0009655 A1 | 1/2017 | Savela | |
| 2017/0030223 A1 | 2/2017 | Parry | |
| 2017/0051629 A1 | 2/2017 | Sutherland | |
| 2017/0058697 A1 | 3/2017 | Copeland | |
| 2017/0089353 A1 | 3/2017 | Zhang | |
| 2017/0145855 A1 | 5/2017 | Ganiger | |
| 2017/0167287 A1 | 6/2017 | Jacobs | |
| 2017/0175523 A1 | 6/2017 | Abrams | |
| 2017/0175581 A1 | 6/2017 | McCune | |
| 2017/0175582 A1 | 6/2017 | McCune | |
| 2017/0234158 A1 | 8/2017 | Savela | |
| 2017/0248191 A1 | 8/2017 | Husband | |
| 2017/0260875 A1 | 9/2017 | McCune | |
| 2017/0361867 A1 | 12/2017 | Lewis | |
| 2018/0156138 A1 | 6/2018 | Elgezabal Gomez et al. | |
| 2019/0338675 A1 | 11/2019 | Schmidt | |
| 2019/0360357 A1 * | 11/2019 | Aguilar | F16C 25/06 |

FOREIGN PATENT DOCUMENTS

| | | |
|---|---|---|
| CN | 101762353 A | 6/2010 |
| CN | 201607302 U | 10/2010 |
| CN | 103123288 | 5/2013 |
| CN | 104132819 A | 11/2014 |
| CN | 205138791 U | 4/2016 |
| CN | 107014531 | 8/2017 |
| CN | 107521552 | 12/2017 |
| CN | 207881876 U | 9/2018 |
| EP | 2829763 | 1/2015 |
| EP | 3330493 | 6/2018 |
| GB | 2113845 A | 8/1983 |
| KR | 101447417 B1 | 10/2014 |
| WO | WO2005/043105 A2 | 5/2005 |
| WO | 2007100338 A1 | 9/2007 |
| WO | 2015043915 | 4/2015 |
| WO | 2015150090 | 10/2015 |

OTHER PUBLICATIONS

Italian Search Report Corresponding to 102018000009034 dated Jun. 6, 2019.

U.S. Appl. No. 15/989,869, filed May 28, 2018.

Carmignani et al., Design of a novel magneto-rheological squeeze-film damper, Smart Materials and Structures, vol. 15, Institute of Physics Publishing, 2006, pp. 164-170 http://resource.isvr.soton.ac.uk/staff/pubs/PubPDFs/Pub8088.pdf.

Kumar et al., Development of Smart Squeeze Film Dampers for Small Rotors, Procedia Engineering, 144, 2016, pp. 790-800.

Ruser et al., "Low-cost magnetic torque sensor principle", Proceedings of IEEE Sensors, vol. 02, pp. 901-904, Jun. 12-14, 2002.

Sasada et al., "A figure-of-eight flexible coil for a magnetostrictive torque sensor", 2006 IEEE International Magnetics Conference (Intermag), pp. 885-885, May 8-12, 2006, San Diego, CA.

Tsujisawa et al., "Proposal and Performance Evaluation of a Magneto-Striction Type Torque Sensor Consisting of Small-Sized Coils Connected in Series", ISRN Electronics, vol. 2012, pp. 08, 2012.

Xu, et al., Squeeze flow behaviors of magnetorheological plastomers under constant volume, The Society of Rheology, Inc., 2014, pp. 659-679.

Zhu et al., A Magneto-rheological Fluid Squeeze Film Damper for Rotor Vibration Control, pp. 516-522.

\* cited by examiner

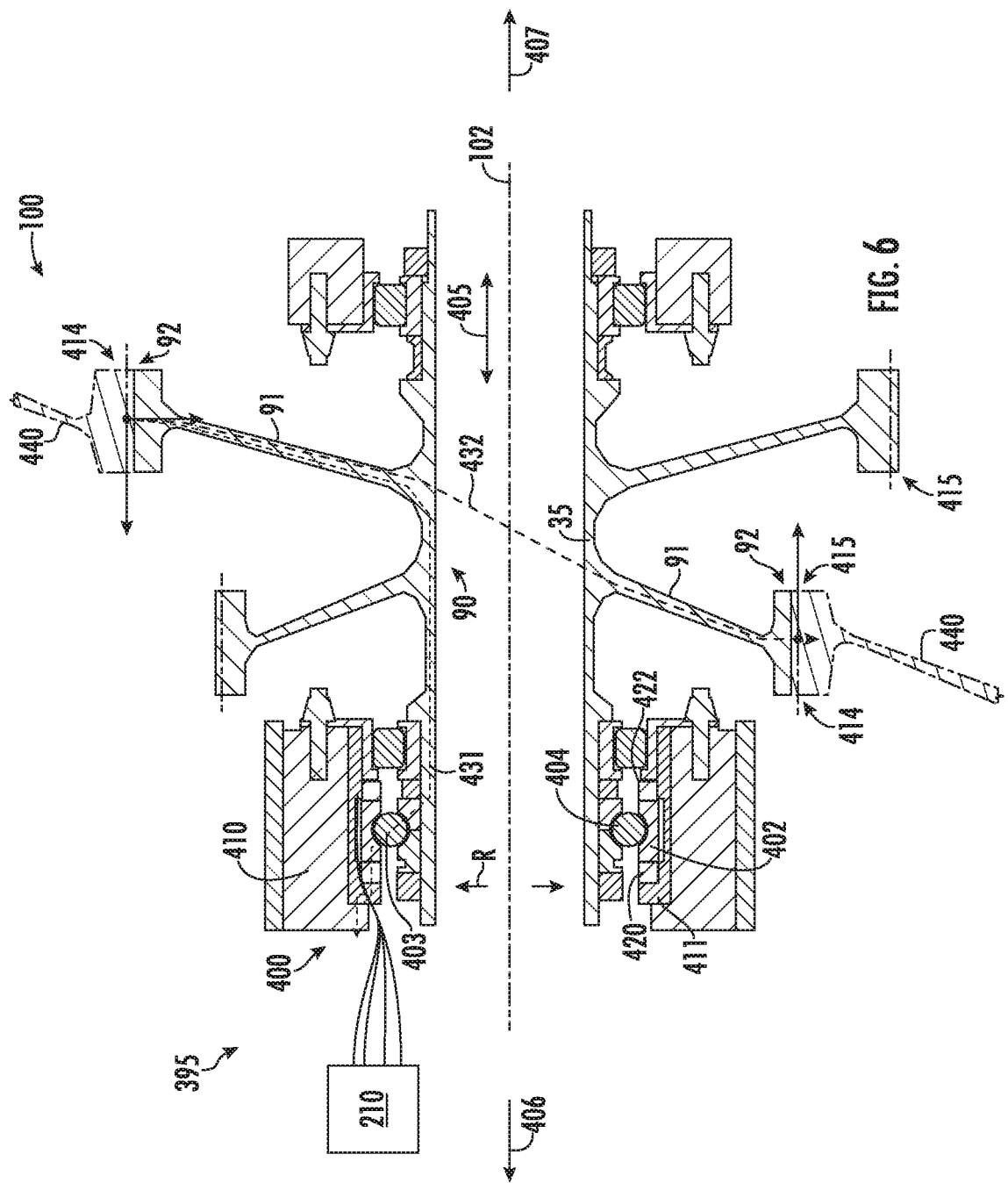

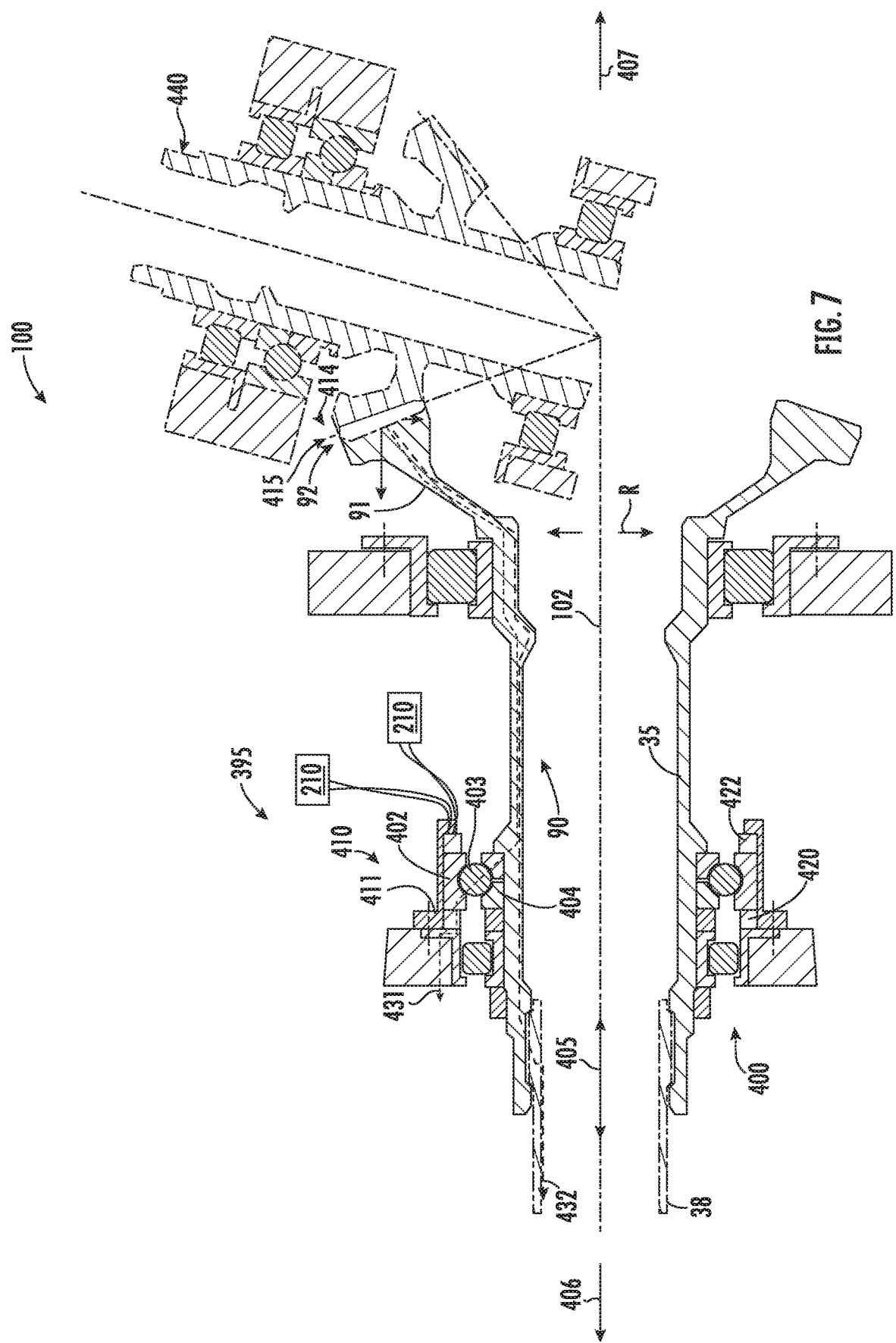

TORQUE MEASUREMENT SYSTEM

FIELD

The present subject matter relates generally to systems for measuring torque at a turbo machine.

BACKGROUND

Turbo machines, such as turboshaft or turboprop gas turbine engines, generally require a torque measurement system to detect shaft torque, such as to provide feedback to a control system for operating the turbo machine and the output shaft torque. Known torque measurement systems generally measure and quantify torsional twist directly at a shaft, such as a static reference shaft. Such known systems and methods generally require additional hardware, such as the reference torque shaft at which torsional twist is measured, in addition to sensors disposed at the shaft, and the physical space for accommodating the additional shaft and sensors. Such systems may be relatively complex and may add weight to the turbo machine or surrounding apparatus, thereby reducing efficiency, reliability, or accuracy.

As such, there is a need for a relatively simpler, lower weight, more accurate, and more reliable torque measurement system.

As such, there is a need for a relatively simpler, lower weight system for measuring torque at a thrust bearing assembly of a turbo machine.

BRIEF DESCRIPTION

Aspects and advantages of the invention will be set forth in part in the following description, or may be obvious from the description, or may be learned through practice of the invention.

An aspect of the present disclosure is directed to a system for torque measurement. The system includes a sensor disposed between an outer bearing race and a static structure of a bearing assembly. The sensor is disposed adjacent along a thrust load direction to the outer bearing race. The system further includes a rotor assembly rotatably coupled to the bearing assembly, and a controller communicatively coupled to the sensor. The controller is configured to execute operations. The operations include determining a torque measurement from the rotor assembly based at least on an axial thrust load from the rotor assembly.

In various embodiments, the operations further include measuring the axial thrust load from the rotor assembly. In one embodiment, measuring the axial thrust load from the rotor assembly further includes measuring the axial thrust load generated from a gear mesh at the rotor assembly in response to the application of a torque thereto.

In one embodiment, determining the torque measurement from the rotor assembly based at least on the axial thrust load is further based at least on the axial thrust load generated via a gear mesh at the rotor assembly.

In another embodiment, the sensor defines a substantially cylindrical geometry disposed adjacent to the outer bearing race and the static structure.

In still another embodiment, the sensor is disposed adjacent along a forward thrust load direction to the outer bearing race.

In yet another embodiment, the sensor is disposed adjacent along a reverse thrust load direction to the outer bearing race.

In still yet another embodiment, the sensor comprises a load cell, a strain gage, a piezoelectric material, or combinations thereof.

In one embodiment, the sensor is disposed between the static structure and the outer bearing race along the thrust load direction.

In another embodiment, the system is disposed at a main transmission of an aircraft.

In still another embodiment, the system is disposed at a gear assembly of an aircraft.

In various embodiments, the system is disposed at a fan assembly of a turbo machine. In one embodiment, the fan assembly includes a variable pitch mechanism at which the system is operatively coupled.

In still another embodiment, the rotor assembly includes a shaft defining a radially extended portion at which a gear mesh is defined, and an input assembly coupled to the shaft at the gear mesh. The radially extended portion includes a driven gear meshed with a driving gear structure at the input assembly.

Another aspect of the present disclosure is directed to an engine including a bearing assembly, a rotor assembly, and a controller. The bearing assembly includes an outer bearing race coupled to a static structure. The bearing assembly further includes a sensor disposed adjacent along a thrust load direction to the outer bearing race. The sensor is configured to determine a torque measurement from the engine. The rotor assembly is rotatably coupled to the bearing assembly via an inner bearing race and a rolling bearing element. The controller is communicatively coupled to the sensor. The controller is configured to execute operations, in which the operations include determining a torque measurement from the rotor assembly based at least on an axial thrust load from the rotor assembly.

In various embodiments, the rotor assembly includes a shaft defining a radially extended portion at which a gear mesh is defined; and an input assembly coupled to the shaft at the gear mesh. The radially extended portion includes a driven gear meshed with a driving gear structure at the input assembly. In one embodiment, the operations further include measuring the axial thrust load from the rotor assembly. In another embodiment, measuring the axial thrust load from the rotor assembly further includes measuring the axial thrust load generated from the gear mesh at the rotor assembly in response to the application of a torque from the input assembly. In yet another embodiment, the sensor defines a first sensor disposed adjacent along a forward thrust load direction to the outer bearing race. In still another embodiment, the bearing assembly further includes a second sensor disposed adjacent along a reverse thrust load direction to the outer bearing race. The second sensor is configured to determine a torque measurement from the engine.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 5-7 are schematic cross sectional views of exemplary embodiments of a torque measurement system of various embodiments of the aircraft, engine, or turbo machine of FIGS. 1-4.

Figure 1:
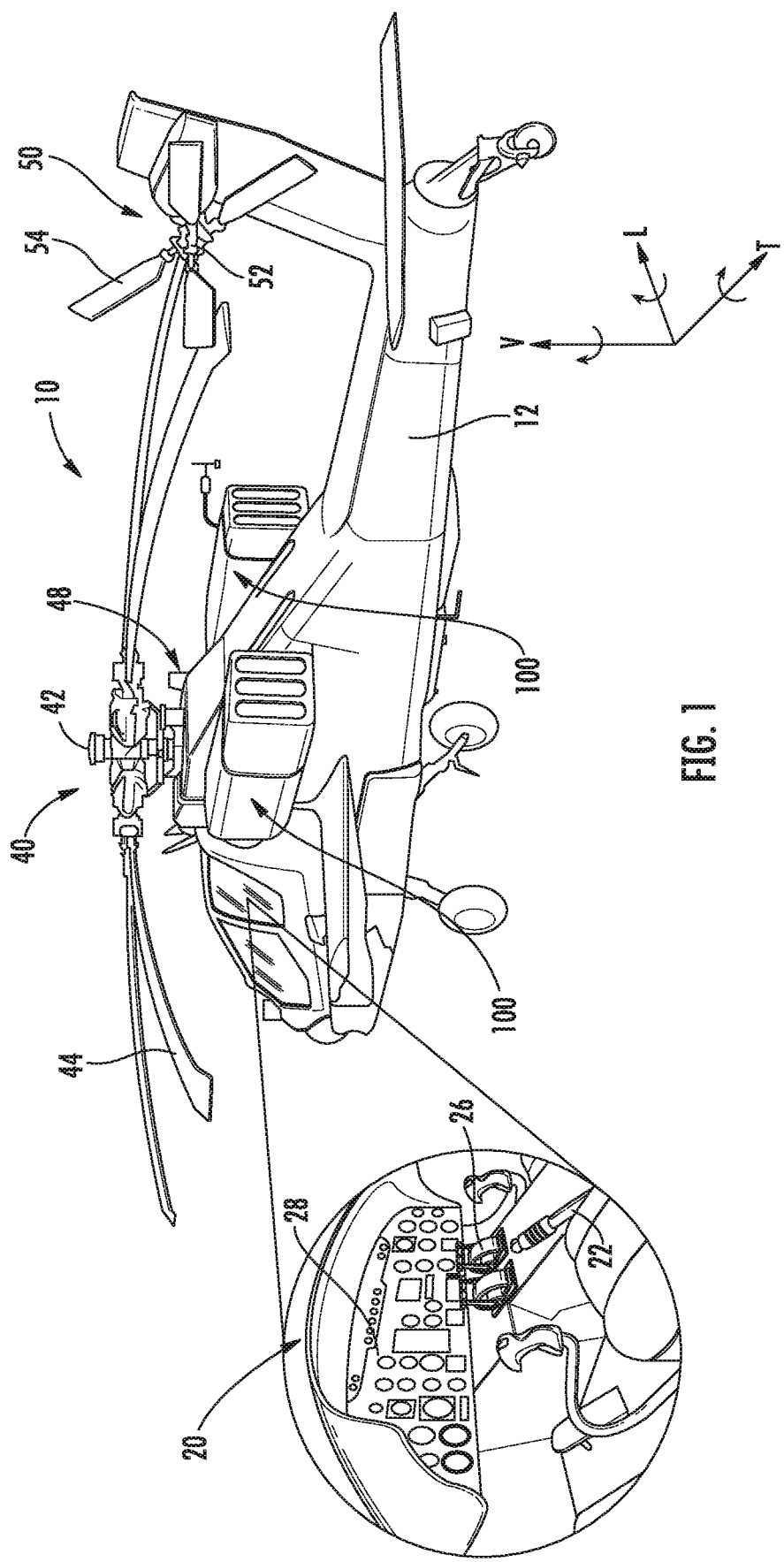
FIG. 1 is an exemplary embodiment of an aircraft according to an aspect of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Embodiments of a system for measuring shaft torque are generally provided. The embodiments generally provided include a turbo machine including a substantially cylindrical sensor disposed adjacent to an outer bearing race of a bearing assembly, in which the sensor is disposed between the outer bearing race and a static structure to which the sensor and outer bearing race are attached. The sensor is disposed adjacent along a thrust loading direction from a rotor assembly rotatably coupled to the bearing assembly and supported by the static structure.

Embodiments of the system generally provided herein may provide a relatively simpler, lower weight system for measuring torque at a turbo machine. Embodiments generally provided herein measure shaft torque via direct correlation between torque and axial thrust at the shaft when helical or bevel gears are rigidly mounted on the shaft, or integrally manufactured thereto. For example, the embodiments generally provided herein may obviate a need for a torque shaft and torque reference tube each extended radially within the rotor assembly. Removing the need for the torque shaft and torque reference tube may decrease the weight and complexity of the mechanical transmission assembly, the engine and aircraft or other apparatus, thereby improving efficiency and performance of the turbo machine and apparatus (e.g., aircraft) to which it is attached.

Figure 2:
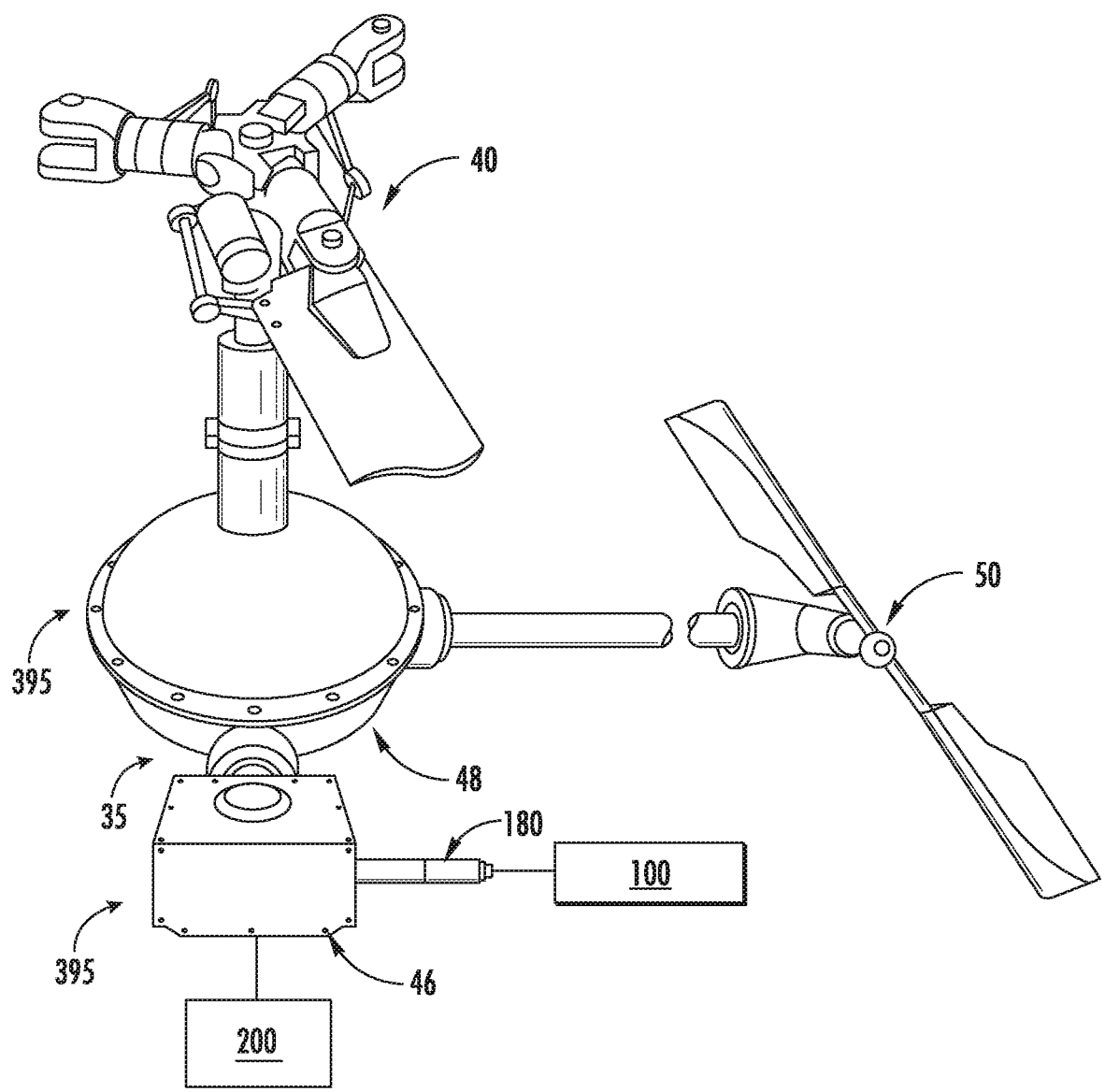
FIG. 2 is an exemplary schematic embodiment of portions of an aircraft including a torque measurement system according to an aspect of the present disclosure.

FIGS. 1-2 provide perspective views of an exemplary aircraft 10 in accordance with the present disclosure. The aircraft 10 defines an orthogonal coordinate system, including three orthogonal coordinate axes. More specifically, the three orthogonal coordinate axes include a lateral axis L, a longitudinal axis T, and a vertical axis V. In operation, the aircraft 10 may move along or around at least one of the lateral axis L, the longitudinal axis T, and the vertical axis V.

In the embodiment illustrated in FIG. 1, the aircraft 10 includes an airframe 12 and a cockpit 20. In one embodiment, the cockpit 20 may include a collective pitch input device 22, one or more throttle input devices 26 and an instrument panel 28. The aircraft 10 further includes a main rotor assembly 40 and a tail rotor assembly 50. The main rotor assembly 40 includes a main rotor hub 42 and a plurality of main rotor blades 44. As shown, each main rotor blade 44 extends outwardly from the main rotor hub 42. The tail rotor section 50 includes a tail rotor hub 52 and a plurality of tail rotor blades 54. Each tail rotor blade 54 extends outwardly from the tail rotor hub 52.

Additionally, the aircraft 10 may include an engine 100 to generate and transmit power to drive rotation of the main rotor blades 44 and the tail rotor blades 54. In particular, rotation of the main rotor blades 44 generates lift for the aircraft 10, while rotation of the tail rotor blades 54 generates sideward thrust at the tail rotor section 50 and counteracts torque exerted on the airframe 12 by the main rotor blades 44.

Referring now to FIGS. 1-2, the aircraft 10 further includes a main transmission 48 disposed mechanically between the engine 100 and the main rotor assembly 40 and the tail rotor assembly 50. The main transmission 48 generally reduces an output speed of the engine 100 to a speed more suitable for operation of the main rotor assembly 40 and/or the tail rotor assembly 50. The main transmission 48 may further direct power from one or more of the engines 100 to one or more accessories of the aircraft 10. Still further, the main transmission 48 may generally change an axis of rotation between the engine 100 and the main rotor assembly 40. Although not shown in further detail, various embodiments of the main transmission 48 may include a clutch assembly to selectively engage or disengage the main rotor assembly 40 and/or tail rotor assembly 50 from the engine 100. Still further, the main transmission 40 includes a lubricant system providing lubricant to gears, bearings, dampers, etc. of the main transmission 48, such as further described below.

It should be appreciated that, although a particular aircraft has been illustrated and described in regard to the aircraft 10, other configurations and/or aircraft, such as high speed compound rotary-wing aircraft with supplemental translational thrust systems, dual contra-rotating, coaxial rotor system aircraft, turboprops, tilt-rotors, tilt-wing aircraft, vertical take-off or short take-off or landing aircraft, conventional take-off and landing aircraft, fixed wing aircraft, and other turbine driven machines will also benefit from the present disclosure.

Figure 3:
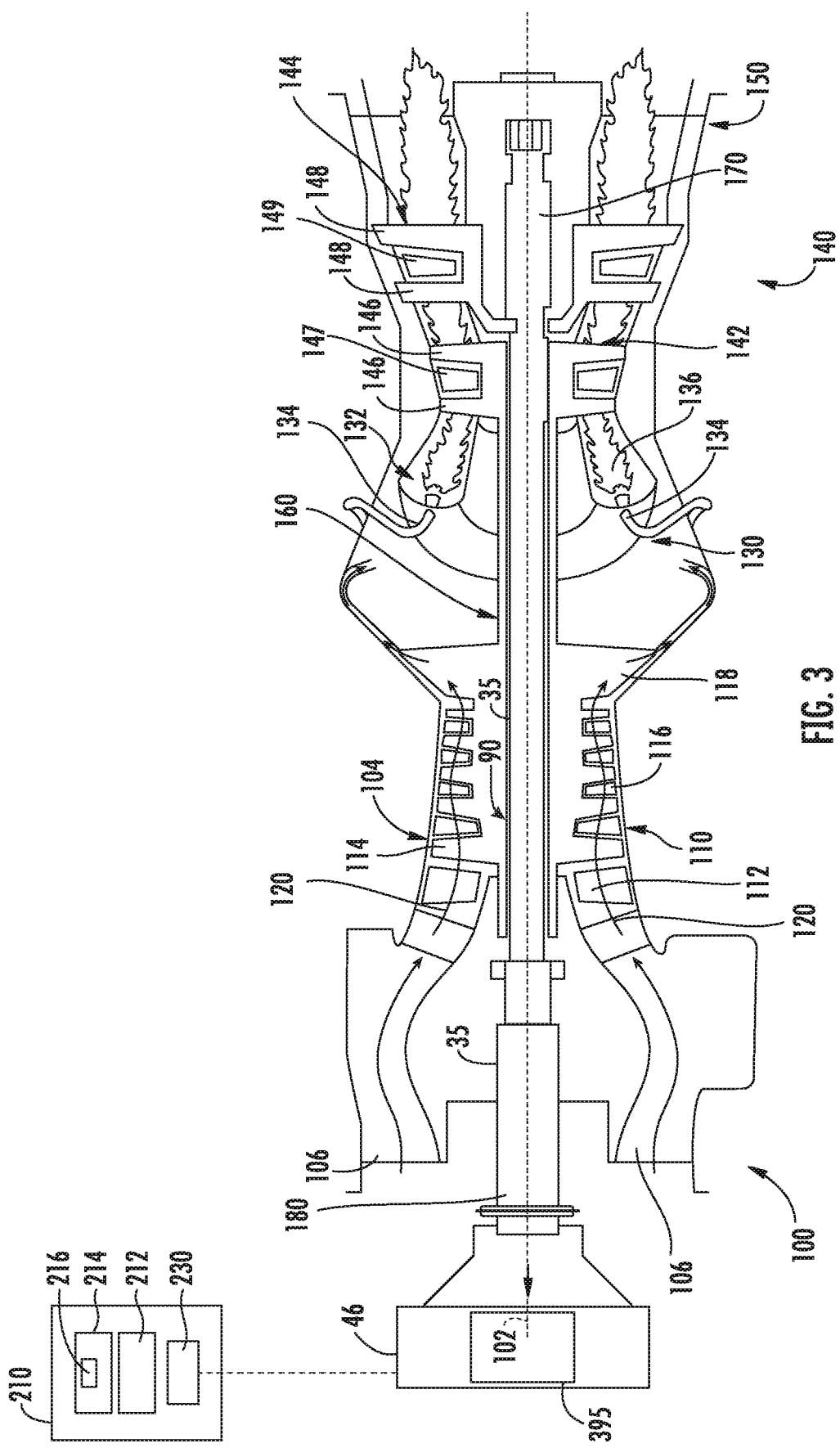
FIG. 3 is a schematic cross sectional view of an exemplary engine according to an aspect of the present disclosure.

FIG. 3 provides a schematic cross-sectional view of an exemplary gas turbine engine 100 in accordance with the present disclosure. As shown in FIG. 3, the gas turbine engine 100 defines a longitudinal or centerline axis 102 extending through for reference. The gas turbine engine 100 may generally include a substantially tubular outer casing 104 that defines an annular inlet 106. The outer casing 104 may be formed from a single casing or multiple casings. The outer casing 104 encloses, in serial flow relationship, a high pressure (HP) or gas generator compressor section 110, a combustion section 130, a turbine section 140, and an exhaust section 150. The gas generator compressor section 110 includes an annular array of inlet guide vanes 112, one or more sequential stages of compressor blades 114, one or more sequential stages of one or more stages of variable vanes 116, one or more sequential stages of one or more stationary compressor vanes, and a compressor rotor 118 (e.g., including an axial and/or centrifugal compressor). Collectively, the compressor blades 114, variable vanes 116, stationary compressor vanes, and the compressor rotor 118 define a compressed air path 120.

The combustion section 130 includes a combustion chamber 132 and one or more fuel nozzles 134 extending into the combustion chamber 132. The fuel nozzles 134 supply fuel to mix with compressed air entering the combustion chamber 132. Further, the mixture of fuel and compressed air combust within the combustion chamber 132 to form combustion gases 136. As will be described below in more detail, the combustion gases 136 drive both the compressor section 110 and the turbine section 140.

The turbine section 140 includes a high pressure (HP) or gas generator turbine 142 and a low pressure (LP) or power turbine 144. The gas generator turbine 142 includes one or more sequential stages of turbine rotor blades 146 and one or more sequential stages of stator vanes 147. Likewise, the power turbine 144 includes one or more sequential stages of turbine rotor blades 148 and one or more sequential stages of stator vanes 149. As will be discussed below in more detail, the gas generator turbine 142 drives the gas generator compressor section 110 via a gas generator shaft 160, and the power turbine 144 drives an output shaft 180 via an LP or power turbine shaft 170.

As shown in the embodiment illustrated in FIG. 3, the gas generator compressor section 110 and the gas generator turbine 142 are coupled to one another via the gas generator shaft 160. In operation, the combustion gases 136 drive both the gas generator turbine 142 and the power turbine 144. As the gas generator turbine 142 rotates around the centerline axis 102, the gas generator compressor section 110 and the gas generator shaft 160 both rotate around the centerline axis 102. Further, as the power turbine 144 rotates, the power turbine shaft 170 rotates and transfers rotational energy to the output shaft 180. As an example, the output shaft 180 of the engine 100 may rotate both the main and tail rotor blades 44, 54 of the aircraft 10 (FIG. 1).

It should be appreciated that, although the aircraft 10 is depicted as including one or more gas turbine engines 100, the aircraft 10 may generally receive power from other engine types, including, but not limited to, piston engines, hybrids, or other engines suitable for transmitting power to one or more of the main rotor assembly 40, the tail rotor section 50, a gear assembly 46, the main transmission 48, or other systems of the aircraft 10.

Figure 4:
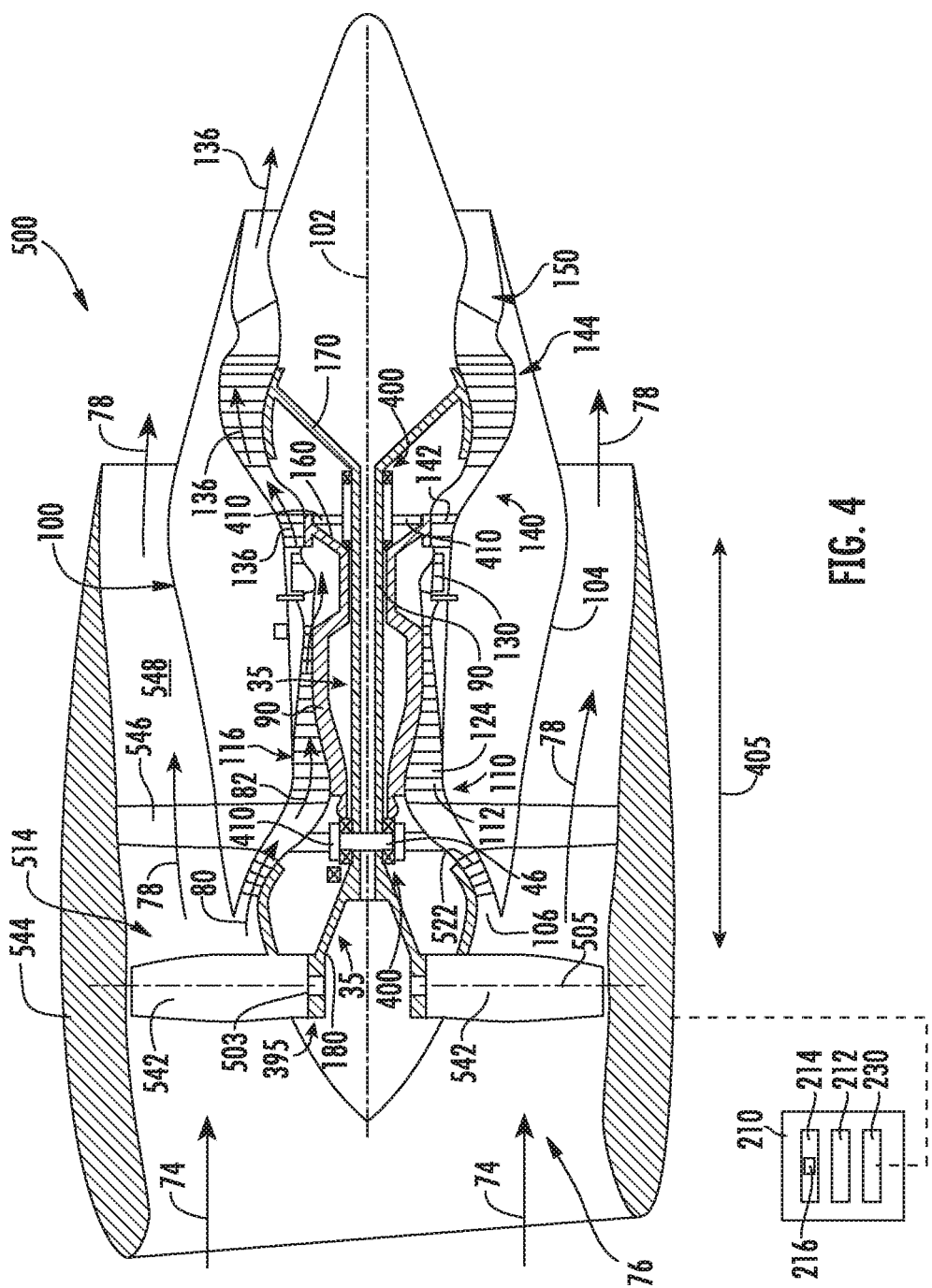
FIG. 4 is a schematic cross sectional view of an exemplary turbo machine according to an aspect of the present disclosure.

Referring now to FIG. 4, another schematic partially cross-sectioned side view of an exemplary turbo machine 500 as may incorporate various embodiments of the present invention is generally provided. Although generally depicted herein as a turbofan configuration, the turbo machine 500 shown and described herein may further include combinations of components shown and described in regard to the engine 100 depicted in regard to FIG. 3. Various embodiments of the turbo machine 500 may define a propfan, turboprop, or turboshaft configuration, including, but not limited to, engines for fixed or rotary-wing aircraft, power generation (e.g., industrial gas turbine engines, auxiliary power units, marine gas turbine engines, etc.), etc. As shown in FIG. 4, the turbo machine 500 includes the engine 100, such as a core engine or gas generator, such as described in regard to FIG. 3. Additionally, the turbo machine 500 may include a propeller or fan assembly 514 and the engine 100 disposed downstream of the fan assembly 514.

The engine 100 may generally include the substantially tubular outer casing 104 that defines the annular inlet 106. The outer casing 104 encases or at least partially forms, in serial flow relationship, the compressor section 110 having a booster or low pressure (LP) compressor 522, a high pressure (HP) compressor 124, or one or more intermediate pressure (IP) compressors (not shown) disposed aerodynamically between the LP compressor 522 and the HP compressor 124; a combustion section 130; a turbine section 140 including a high pressure (HP) turbine 142, a low pressure (LP) turbine 144, and/or one or more intermediate pressure (IP) turbines (not shown) disposed aerodynamically between the HP turbine 142 and the LP turbine 144; and a jet exhaust nozzle section 150. A high pressure (HP) rotor shaft 160 drivingly connects the HP turbine 142 to the HP compressor 124. A low pressure (LP) rotor shaft 170 drivingly connects the LP turbine 144 to the LP compressor 522. In other embodiments, an IP rotor shaft drivingly connects the IP turbine to the IP compressor (not shown). The LP rotor shaft 170 may also, or alternatively, be connected to a propeller, fan, or generally output shaft 180 of the fan assembly 514. In particular embodiments, such as shown in FIG. 4, the LP rotor shaft 170 may be connected to the output shaft 180 via a power or reduction gear assembly 46 such as in an indirect-drive or geared-drive configuration.

Combinations of the compressors 522, 142, the turbines 142, 144, and the shafts 160, 170, 180 each define a rotor assembly 90 of the engine 100. For example, in various embodiments, the LP turbine 144, the LP shaft 170, the fan assembly 514 and/or the LP compressor 522 together define the rotor assembly 90 as a low pressure (LP) rotor assembly. The rotor assembly 90 may further include the fan rotor 180 coupled to the fan assembly 514 and the LP shaft 170 via the gear assembly 46. As another example, the HP turbine 142, the HP shaft 160, and the HP compressor 124 may together define the rotor assembly 90 as a high pressure (HP) rotor assembly. It should further be appreciated that the rotor assembly 90 may be defined via a combination of an IP compressor, an IP turbine, and an IP shaft disposed aerodynamically between the LP rotor assembly and the HP rotor assembly.

As shown in FIG. 4, the fan assembly 514 includes a plurality of propeller or fan blades 542 that are coupled to and that extend radially outwardly from the output shaft 180. An annular fan casing or nacelle 544 circumferentially surrounds the fan assembly 514 and/or at least a portion of the engine 100. It should be appreciated by those of ordinary skill in the art that the nacelle 544 may be configured to be supported relative to the engine 100 by a plurality of circumferentially-spaced outlet guide vanes or struts 546. Moreover, at least a portion of the nacelle 544 may extend over an outer portion of the engine 100 so as to define a bypass airflow passage 548 therebetween.

Referring still to FIG. 4, the fan assembly 514 may include a pitch axis 505 defined through the propeller or fan blades 542. The fan assembly 514 may include a variable pitch mechanism 503 enabling rotation of the blades 542 relative to the pitch axis 505. In various embodiments, a torque measurement system 395, such as further described in regard to FIGS. 5-7, may be included at the fan assembly 514 such as to measure torque at the propeller or fan blades 542. The measured torque may be utilized at a controller 210, such as further described below, to provide input and response for operation of the fan assembly 514 and the engine 100 providing power to the fan assembly 514 (e.g., via the output shaft 180).

During operation of the turbo machine 500, as shown in FIG. 4 collectively, a volume of air as indicated schematically by arrows 74 enters the engine 100 through an associated inlet 76 of the nacelle 544 and/or fan assembly 514. As the air 74 passes across the fan blades 542 a portion of the air as indicated schematically by arrows 78 is directed or routed into the bypass airflow passage 548 while another portion of the air as indicated schematically by arrow 80 is directed or routed into the LP compressor 522. Air 80 is progressively compressed as it flows through the LP and HP compressors 522, 142 towards the combustion section 130.

Referring still to FIG. 4, the combustion gases 136 generated in the combustion section 130 flow to the HP turbine 142 of the turbine section 140, thus causing the HP shaft 160 to rotate, thereby supporting operation of the HP compressor 124. As shown in FIG. 4, the combustion gases 136 are then routed to the LP turbine 144, thus causing the LP shaft 170 to rotate, thereby supporting operation of the LP compressor 522 and rotation of the output shaft 180. The combustion gases 136 are then exhausted through the jet exhaust nozzle section 150 of the engine 100 to provide propulsive thrust.

Figure 5:
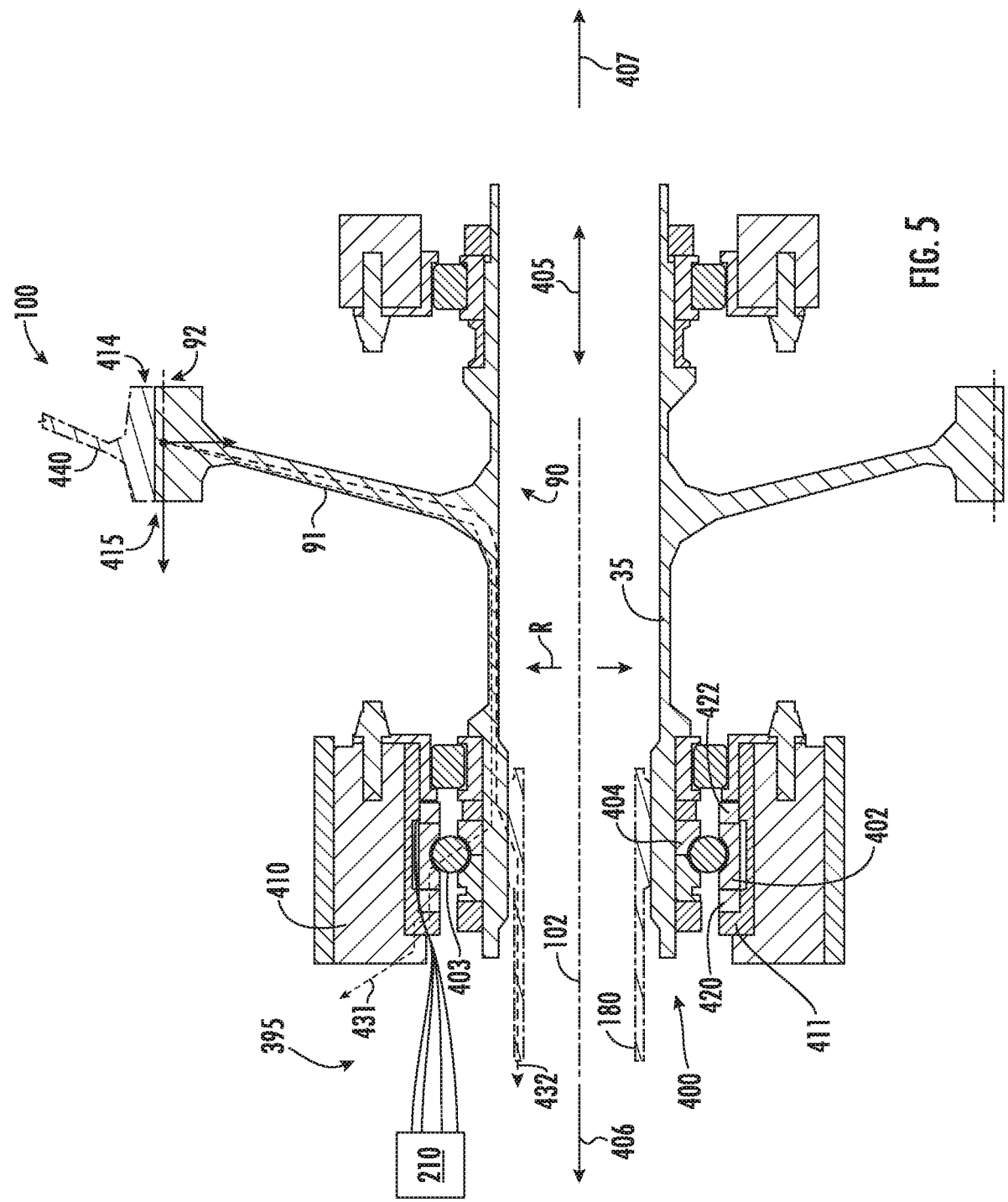

Referring to FIGS. 3-7, in various embodiments, the rotor assembly 90 further includes a bearing assembly 400 enabling rotation of the shaft 35 (e.g., shaft 160, 170, 180) relative to a surrounding grounding or static structure 410 (e.g., outer casing 104), such as further shown and described in regard to FIG. 5-7. The bearing assembly 400 includes an outer bearing race 402, an inner bearing race 404, and a rolling bearing element 403 disposed therebetween. In various embodiments, the outer bearing race 402 is coupled to the static structure 410. The static structure 410 may include a bearing housing, a gear assembly housing, a propeller gear assembly housing, or another suitable static structure to support rotation of the rotor assembly 90. The inner bearing race 404 is coupled to the rotor assembly 90. The rolling bearing element 403 may define a bearing configured to respond to axial loads along the thrust loading direction 405, such as a thrust bearing generally, or, more specifically, a ball bearing.

Referring now to FIGS. 5-7, a schematic view of an exemplary embodiment of a torque measurement system 395 is generally provided. The torque measurement system 395 may be disposed at the gear assembly 46, the main transmission 48, the one or more bearing assemblies 400 including those that may be disposed at the gear assembly 46, the main transmission 48, or coupled to one or more shafts 35 (e.g., LP shaft 160, HP shaft 170, output shaft 180, etc.), or another suitable mechanical transmission system at the aircraft 10 or engine 1000. In various embodiments, the bearing assembly 400 includes an outer bearing race 402 coupled to a static structure 410. The bearing assembly 400 further includes a sensor 420 disposed adjacent along a thrust load direction 405 to the outer bearing race 402. The sensor 420 is configured to determine a torque measurement from the engine 100. In various embodiments, the sensor 420 is coupled directly to the outer bearing race 402 along the thrust load direction 405. The sensor 402 may further, or alternatively, be coupled to the static structure 410, or more specifically a sleeve 411 at the static structure 410, and adjacent to the outer bearing race 402 along the thrust load direction 405.

In various embodiments, the rotor assembly 90 includes a radially extended portion 91 extended from the shaft 35. A gear mesh 415 is defined at the rotor assembly 90 and an input assembly 440. The gear mesh 415 includes a spline or other appropriate gear geometry. In various embodiments, the gear mesh 415 at the rotor assembly 90 and the input assembly 440 together define a helical gear, a spur gear, a bevel gear, or other appropriate geometry to transfer torque and the axial load proportional to the torque that is transferred to the sensor 420. A distal end of the radially extended portion 91 includes a driven gear 92, such as a spline or other appropriate gear geometry. The driven gear 92 at the radially extended portion 91 of the shaft 35 is coupled to, attached, or otherwise meshed with a driving gear structure 414 at the input assembly 440, such as a corresponding spline or other appropriate gear geometry. In various embodiments, the input assembly 440 may include the gear assembly 46, a radial or towershaft, a main transmission, or other power transmission device.

The engine 100 generally defines an axial load path, shown schematically by line 431, extended through the rotor assembly 90, the outer bearing race 402, and the sensor 420. The engine 100 may further define a torque load path, shown schematically by line 432, extended from the driving gear structure 414 through the rotor assembly 90.

In various embodiments, the axial load path 431 is extended from the driving gear structure 414 through the radially extended portion 91 of the shaft 35 to the bearing assembly 400 (e.g., through the inner bearing race 404, the rolling bearing element 403, and the outer bearing race 402), the sensor 420, and through the static structure 410. The sensor 420 receives the axial load from the driving gear structure 414 and determines a torque measurement based at least on the received loading.

In one embodiment, such as generally depicted in regard to FIG. 5, the driving gear structure 414 may include a portion of the gear assembly 46 receiving power from a power turbine or LP turbine 30 (FIG. 1).

In another embodiment, such as generally depicted in regard to FIG. 6, the driving gear structure 414 may include two or more separate radially extended portions 91 coupled to two or more driving gear structures 414. The driving gear structure 414, and corresponding driven gear 92, may together define a helical angle to the meshed gears such as to generate a net axial loading at the rolling bearing element 403 of the bearing assembly 400.

In yet another embodiment, such as generally depicted in regard to FIG. 7, the engine 100 may include the input assembly 440 disposed at least partially radially relative to the rotor assembly 90. The input assembly 440 includes the driving gear structure 414 coupled to the radially extended portion 91 of the shaft 35. The input assembly 440 may include a plurality of bearing assemblies enabling rotation and transfer of power from a power source. For example, the input assembly 440 may receive power from a gas generator, an electric machine, or another configuration of the engine 100. The rotor assembly 90 may define a portion of a transmission for a rotary wing vehicle (e.g., a helicopter, a tilt-rotor aircraft, etc.). It should there be appreciated that various embodiments of the bearing assembly 400 and rotor assembly 90 may be disposed in longitudinal, transverse, or radial arrangements different from the exemplary embodiment generally shown in regard to the engine 100 of FIG. 1.

In various embodiments, the sensor 420 is disposed between the outer bearing race 402 and the static structure 410 of the bearing assembly 400 and adjacent to the outer bearing race 402 along the thrust load direction 405. A controller 210, further described below in regard to FIGS. 3-7, is communicatively coupled to the sensor 420 to execute operations to determine the torque measurement from the rotor assembly 90 based at least on an axial thrust load (i.e. along the thrust load direction 405) from the rotor assembly 90.

In one embodiment, the controller 210 stores instructions or operations for determining the torque (e.g., represented via torque load path 432) at the shaft proportional to the axial thrust load (e.g., represented via axial load path 431) from the input assembly 440. The operations may further include determining or measuring the axial thrust load 431 from the rotor assembly 90 via the sensor 420. Determining or measuring the axial thrust load 431 from the rotor assembly 90 may further include determining or measuring the axial thrust load 431 generated from the gear mesh 415 at the rotor assembly 90 and the input assembly 440 in response to the application of torque thereto at the gear mesh 415. In various embodiments, determining or measuring torque 432 from the rotor assembly 90 and input assembly 440 is based at least on the axial thrust load 431 and further based at least on the axial thrust load 431 generated via the gear mesh 415.

In one embodiment, the sensor 420 defines a substantially cylindrical geometry disposed adjacent to the outer bearing race 402 and the static structure 410. In still various embodiments, the sensor 420 includes a load cell and/or a strain gage. The sensor 420 may further include a piezoelectric material in combination with the load cell and/or strain gage. The piezoelectric material may respond to loads from the rotor assembly 90. For example, during operation of the engine 100, the rotor assembly 90 will generally move and load axially along the thrust load direction 405, such as based on thrust output, or changes in thrust output, from the rotor assembly 90 onto the bearing assembly 400. In one embodiment, the sensor 420 is disposed adjacent to the outer bearing race 402 along a forward thrust load direction (e.g., along direction 406). In another embodiment, the sensor 420 (e.g., a second sensor 422) may be disposed adjacent to the outer bearing race 402 along a reverse thrust load direction (e.g., along direction 407).

For example, during forward thrust loading operation of the engine 100, the rotor assembly 90 may apply a substantially axial load onto the sensor 420 (e.g., along direction 406) via the outer bearing race 402 loaded toward the sensor 420 and the static structure 410. In another exemplary embodiment, the engine 100 and bearing assembly 400 may include a second sensor 422 disposed adjacent to the outer bearing race 402 opposite of the sensor 420. For example, the sensor 420 may be configured to determine the forward thrust load (i.e., loading corresponding to direction 406) from the rotor assembly 90 and the second sensor 422 may be configured to determine the reverse thrust load (i.e., loading corresponding to direction 407) from the rotor assembly 90. The reverse thrust loading along direction 407 may correspond to thrust crossover of the engine 100 at the rotor assembly 90 and bearing assembly 400 (e.g., thrust loading corresponding to a change in rotor speed from decreasing to increasing, or a change in rotor speed from increasing to decreasing).

Various embodiments of the piezoelectric material included at the sensor 420 may include a piezoelectric crystal, a piezoelectric ceramic, or a piezoelectric polymer. In still various embodiments, the sensor 420 may include langasite, gallium orthophosphate, lithium niobate, lithium tantalite, barium titanate, lead titanate, lead zirconate, lead zirconate titanate, potassium niobate, sodium tungstate, $Ba_2NaNb_5O_5$, $Pb_2KNb_5O_{15}$, zinc oxide, polyvinyfluoride, polyvinylidene fluoride, porous polypropylene, fluoroethylenepropylene, polytetrafluoroethylene, cellular cycloolefines, cellular polyethylene terephthalate, or combinations thereof, or other appropriate piezoelectric materials.

Referring back to FIGS. 3-4, in conjunction with FIGS. 5-7, the controller 210 included with the engine 100 can correspond to any suitable processor-based device, including one or more computing devices. For instance, FIGS. 3-4 illustrate one embodiment of suitable components that can be included within the controller 210. As shown in FIGS. 3-4, the controller 210 can include a processor 212 and associated memory 214 configured to perform a variety of computer-implemented functions. In various embodiments, the controller 210 may be configured to determine a torque measurement from the rotor assembly 90 based at least on an axial thrust load (e.g., along thrust loading direction 405) from the rotor assembly 90.

As used herein, the term "processor" refers not only to integrated circuits referred to in the art as being included in a computer, but also refers to a controller, microcontroller, a microcomputer, a programmable logic controller (PLC), an application specific integrated circuit (ASIC), a Field Programmable Gate Array (FPGA), and other programmable circuits. Additionally, the memory 214 can generally include memory element(s) including, but not limited to, computer readable medium (e.g., random access memory (RAM)), computer readable non-volatile medium (e.g., flash memory), a compact disc-read only memory (CD-ROM), a magneto-optical disk (MOD), a digital versatile disc (DVD) and/or other suitable memory elements or combinations thereof. In various embodiments, the controller 210 may define one or more of a full authority digital engine controller (FADEC), a propeller control unit (PCU), an engine control unit (ECU), or an electronic engine control (EEC).

As shown, the controller 210 may include control logic 216 stored in memory 214. The control logic 216 may include instructions that when executed by the one or more processors 212 cause the one or more processors 212 to perform operations, such as determining or measuring torque from the rotor assembly 90 based at least on axial thrust loading 431 (e.g., along the thrust loading direction 405) via a sensor 420 disposed between the outer bearing race 402 and the static structure 410, such as further shown and described in regard to FIGS. 5-7.

Additionally, as shown in FIGS. 3-4, the controller 210 may also include a communications interface module 230. In various embodiments, the communications interface module 230 can include associated electronic circuitry that is used to send and receive data. As such, the communications interface module 230 of the controller 210 can be used to receive data from the rotor assembly 90, the bearing assembly 400, the static structure 410, and/or the sensor 420. The communications interface module 230 may receive and send data corresponding to an operational parameter from the sensor 420, stress or strain (e.g., a strain gage), thrust output or applied load (e.g., a load cell), or pressure (e.g., a pressure transducer). It should be appreciated that other sensors coupled or proximate to the rotor assembly 90 and/or the static structure 410 may further receive and send data corresponding to rotational speed (e.g., a 1/rev signal, a tachometer, or other speed detection device proximate to the rotor assembly 90), vibrations (e.g., accelerometer, proximity probe, etc.), or thrust output corresponding to an engine pressure ratio. In addition, the communications interface module 230 can also be used to communicate with any other suitable components of the engine 100, including any number of sensors configured to monitor one or more operating parameters of the engine 100.

It should be appreciated that the communications interface module 230 can be any combination of suitable wired and/or wireless communications interfaces and, thus, can be communicatively coupled to one or more components of the engine 100 (e.g., the rotor assembly 90, the bearing assembly 400, the static structure 410, etc., or other sensors distributed there throughout) via a wired and/or wireless connection. As such, the controller 210 may communicate with one or more sensors 420 to determine a torque measurement via an axial loading from the rotor assembly 90 to the static structure 410 via the sensor 420.

Referring now to FIGS. 5-7, exemplary embodiments of a portion of the engine 100 including the rotor assembly 90 coupled to the bearing assembly 400 and supported by the static structure 410 are generally provided. The rotor assembly 90 includes a shaft 35. The shaft 35 may generally be disposed at least partially extended through the gear assembly 46, the main transmission 48, or another mechanical transmission system. In various embodiments, the shaft 35 may define the HP shaft 160 (FIGS. 3-4), the LP shaft 170 (FIGS. 3-4), or the output shaft 180 (FIGS. 3-4). The shaft 35 is coupled to the inner bearing race 404. The shaft 35 and the inner bearing race 404 are together supported at least by the static structure 410 (e.g., a casing, a bearing housing, a gear assembly housing, etc.) via the rolling bearing element 403 and the outer bearing race 402 coupled, fixed, or otherwise attached to the static structure 410. In various embodiments, the static structure 410 further includes a sleeve 411 defining a substantially circumferential portion and a radially extended portion against which the outer bearing race 402 applies loads in a radial direction R (i.e., extended from the axial centerline axis 102) and along the thrust load direction 405 (i.e., along an axial direction co-directional to the axial centerline axis 102). In various embodiments, the outer bearing race 402 is coupled directly to the sleeve 411 of the static structure 410. The sleeve 411 may further be coupled directly to the static structure 410 (e.g., defining a casing, housing, or other fixed structure).

It should further be appreciated that various embodiments of the bearing assembly 400 generally provided herein may be configured for the gear assembly 46, or fixed to a casing (e.g., outer casing 104), or another static support structure of the engine 100, the turbo machine 500, or the aircraft 10. In still various embodiments, the torque measurement system 395 may be included as a portion of the main transmission 48 or gearbox assembly 46 for a rotary wing aircraft (e.g., such as described in regard to FIGS. 1-2). Although positioning of the sensor 420 relative to the static structure 410 and the rotor assembly 90 described herein may refer to an axial direction, it should be appreciated that the engine 100, the aircraft 10, and systems generally shown and described herein may be oriented, positioned, placed, or otherwise disposed along a radial direction, a lateral direction (e.g., lateral axis L in regard to FIG. 1), a transverse or longitudinal direction (e.g., longitudinal axis T in regard to FIG. 1), a vertical direction (e.g., vertical direction V in regard to FIG. 1) etc., such that the sensor 420 is generally adjacent to the outer bearing race 402 relative to an axis along which the rotor assembly 90 is generally or substantially extended (e.g., along the direction of the axial centerline axis 102 depicted in FIGS. 3-7), or a path along which axial loading 431 and/or torque loading 432 is generally extended.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for torque measurement, the system comprising:
    a sensor disposed between an outer bearing race and a static structure of a bearing assembly, wherein the sensor is disposed adjacent along a thrust load direction to the outer bearing race;
    a rotor assembly rotatably coupled to the bearing assembly, wherein the rotor assembly comprises:
        a shaft defining a radially extended portion at which a gear mesh is defined; and
        an input assembly coupled to the shaft at the gear mesh; and
    a controller communicatively coupled to the sensor, wherein the controller is configured to execute operations, the operations comprising:
        determining or measuring an axial thrust load from the rotor assembly via the sensor; and
        determining a torque measurement from the rotor assembly based at least on the axial thrust load from the rotor assembly.

2. The system of claim 1, wherein determining or measuring the axial thrust load from the rotor assembly further includes measuring the axial thrust load generated from the gear mesh at the rotor assembly in response to an application of a torque thereto.

3. The system of claim 1, wherein determining the torque measurement from the rotor assembly based at least on the axial thrust load is further based at least on the axial thrust load generated via the gear mesh at the rotor assembly.

4. The system of claim 1, wherein the sensor defines a substantially cylindrical geometry disposed adjacent to the outer bearing race and the static structure.

5. The system of claim 1, wherein the sensor is disposed adjacent along a forward thrust load direction to the outer bearing race.

6. The system of claim 1, wherein the sensor is disposed adjacent along a reverse thrust load direction to the outer bearing race.

7. The system of claim 1, wherein the sensor comprises a load cell, a strain gage, a piezoelectric material, or combinations thereof.

8. The system of claim 1, wherein the sensor is disposed between the static structure and the outer bearing race along the thrust load direction.

9. The system of claim 1, wherein the system is disposed at a main transmission of an aircraft.

10. The system of claim 1, wherein the system is disposed at a gear assembly of an aircraft.

11. The system of claim 1, wherein the system is disposed at a fan assembly of a turbo machine.

12. The system of claim 11, wherein the fan assembly includes a variable pitch mechanism at which the system is operatively coupled.

13. The system of claim 1, wherein the radially extended portion of the shaft comprises a driven gear meshed with a driving gear structure at the input assembly.

14. An engine, the engine comprising:
a bearing assembly comprising an outer bearing race coupled to a static structure, wherein the bearing assembly further comprises a sensor disposed adjacent along a thrust load direction to the outer bearing race, and wherein the sensor is configured to determine a torque measurement from the engine;
a rotor assembly rotatably coupled to the bearing assembly via an inner bearing race and a rolling bearing element, wherein the rotor assembly comprises:
  a shaft defining a radially extended portion at which a gear mesh is defined; and
  an input assembly coupled to the shaft at the gear mesh; and
a controller communicatively coupled to the sensor, wherein the controller is configured to execute operations, the operations comprising:
  determining or measuring an axial thrust load from the rotor assembly via the sensor; and
  determining a torque measurement from the rotor assembly based at least on the axial thrust load from the rotor assembly.

15. The engine of claim 14, wherein the radially extended portion comprises a driven gear meshed with a driving gear structure at the input assembly.

16. The engine of claim 14, wherein determining or measuring the axial thrust load from the rotor assembly further includes measuring the axial thrust load generated from the gear mesh at the rotor assembly in response to an application of a torque from the input assembly.

17. The engine of claim 16, wherein the sensor defines a first sensor disposed adjacent along a forward thrust load direction to the outer bearing race, and wherein the bearing assembly further comprises:
  a second sensor disposed adjacent along a reverse thrust load direction to the outer bearing race, wherein the second sensor is configured to determine the torque measurement from the engine.

* * * * *